Figure 1:
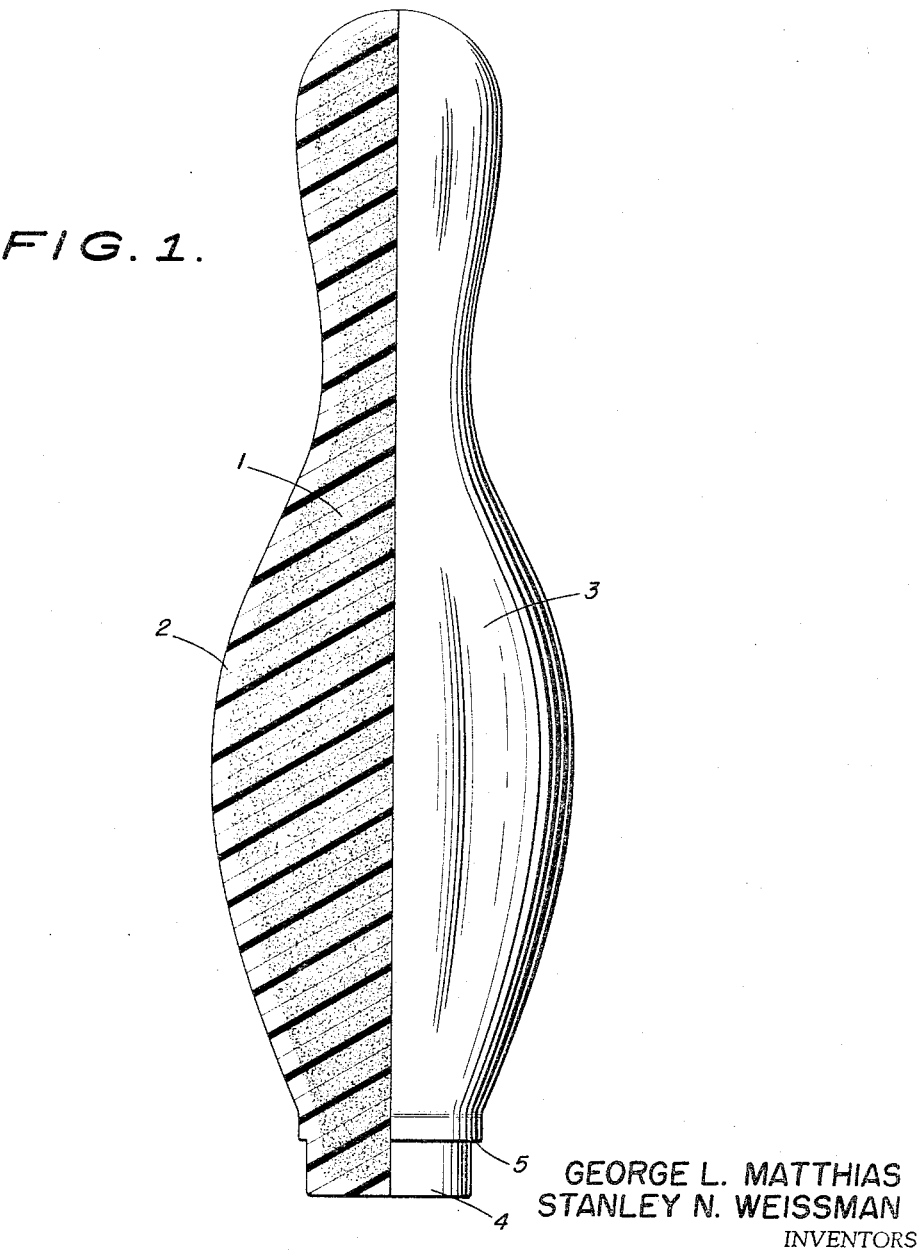

Feb. 28, 1967 S. N. WEISSMAN ET AL 3,306,960
METHOD OF MOLDING A FOAMED PLASTIC STRUCTURE HAVING
A SMOOTH OUTSIDE SURFACE
Filed Aug. 13, 1963 2 Sheets-Sheet 1

GEORGE L. MATTHIAS
STANLEY N. WEISSMAN
INVENTORS

BY Francis H. Dief
ATTORNEY

GEORGE L. MATTHIAS
STANLEY N. WEISSMAN
INVENTORS

BY Francis H. Dief
ATTORNEY 3,306,960
METHOD OF MOLDING A FOAMED PLASTIC STRUCTURE HAVING A SMOOTH OUTSIDE SURFACE
Stanley N. Weissman, Cedar Grove, and George L. Matthias, Belleville, N.J., assignors to W. R. Grace & Co., a corporation of Connecticut
Filed Aug. 13, 1963, Ser. No. 301,741
4 Claims. (Cl. 264—51)

The present invention relates to a novel and useful process for preparing a foamed plastic shaped structure. More particularly, it relates to a process for forming a plastic shaped structure having a foamed core with a solid outer plastic layer having a smooth outside surface as molded and to the product itself.

It is known in the art that various plastics have high abrasion resistance, good machinability, and accordingly such plastics have found widespread use as a substitute for objects previously fabricated from wood. In many instances, however, such a substitution is not desirable due to particular characteristics which are related to the density of the final product. For example, in the fabrication of bowling pins it is desired that the pin have a specific density and, correspondingly, a specific center of gravity so as to be interchangeable with other pins and give reproducible results game after game. For this reason, the art has generally turned to a hollow bowling pin when they are to be fabricated from plastics since the density of the plastic does not correspond to the density of wood (see U.S. Patent 3,044,777). Hollow pins, however, lack the proper sound characteristics and bounce characteristics. It would be highly desirable, therefore, to produce such an article with a hard outer surface and a formed core so that the density and, correspondingly, the center of gravity could be changed so as to be the same as the wood it replaces.

In our copending application, Serial No. 255,923, filed February 4, 1963, now Patent No. 3,155,753, a process is described for modifying the sound and bounce characteristics of a shaped structure such as a bowling pin by employing a foamed-in-place filling of the hollow structure. Such a process, however, requires the formation of the hollow shaped structure, the finishing or polishing of the outside of the structure and a final filling of the structure with foam. Obviously, if a process could be developed which would elminate the prefabrication of the hollow article and the finishing step used for the outside surface, it would receive widespread acceptance in the molding field.

It is an object of the present invention to provide a simple and convenient method of forming a shaped structure having a foamed plastic core covered with an integral substantially unfoamed plastic layer. Another object is to provide a process for forming such a product with a smooth outside surface at molded. A still further object is to provide a substantially finished bolwing pin in a single one step process. A still further object is to provide a process in which the overall density of a foamed shaped structure can be varied within wide limits as desired. Other objects will become apparent as the description of the invention proceeds.

These objects are accomplished by the present invention which provides a process for preparing a shaped structure having a foamed plastic core covered with an integral substantially unfoamed plastic layer having a smooth outside surface as molded, which comprises heating a composition containing a plastic and a blowing agent to a temperature above both the softening point of the resin and the temperature at which the blowing agent forms bubbles, filling a mold with said composition prior to complete formation of bubbles from the blowing agent, sealing the mold, maintaining the interior surface of the mold at a temperature above the softening point of the plastic and below the temperature at which the blowing agent forms bubbles until some pressure from the blowing agent builds up in the central portion of the mold cavity, cooling the plastic composition in the mold to solidify the plastic and removing the resulting shaped structure from the mold.

The present invention also provides a shaped structure comprising a foamed plastic core covered with an integral substantially unfoamed plastic layer having a smooth outside surface as molded; the said plastic layer having essentially the same chemical composition as the foamed plastic core.

In a preferred embodiment of the present invention, the plastic is a poly(alpha-olefin), more preferably, a high density polyethylene homopolymer or copolymer, and the blowing agent is a chemical blowing agent, preferably azobiscarbonamide or para-toluene sulfonyl semicarbazide. The final product generally has an outside layer of at least about $\frac{1}{16}''$ in thickness and in most instances it is desired that it be at least about $\frac{1}{8}''$ in thickness. The process is particularly suited for the formation of substantially finished bowling pins.

The expression "shaped structure" signifies any article which has sufficient dimensions so as to contain a foamed core and a solid exterior unfoamed plastic layer. While the invention is particularly described with respect to the molding of a substantially finished bowling pin, it may be used for the formation of other shaped structures such as shoe lasts, shoe heels, floats, fenders for boats, toy baseball bats, floating toys, surf boards, insulation panels, car panels and the like. The different types of shaped structures than can be produced are practically limitless.

The expression "foamed plastic" merely signifies the conventional product whereby a "blowing agent" or "foaming agent" is employed in a molten plastic to cause the formation of numerous small bubbles in the plastic. The term "covered" merely signifies that substantially all of the central core is surrounded by the unfoamed layer.

The term "integral" merely signifies that there is a continuous plastic phase from the unfoamed plastic layer to the foamed plastic core. While in the final molding it may appear that there is a boundary between the foamed core and the outer unfoamed layer, close inspection will show that the structure is actually a single continuous plastic phase through the boundary from the outside layer to the inner core. The expression "substantially unfoamed plastic layer" designates that the blowing agent contained in the unfoamed plastic layer has not formed any substantial amount of bubbles. Obviously, if a gas is employed as a blowing agent or if a volative liquid is so employed, the outside layer will contain a very small number of bubbles which are insignificant with respect to the number and size contained in the foamed core.

The expression "smooth outside surface as molded" means that the exterior surface of the outside layer substantially conforms to the smoothness or roughness of the mold itself and is in a substantially finished form as molded without surface irregularities or defects.

The term "plastic" is used to signify any of the conventional polymeric materials which are thermoplastic and suitable for conventional molding procedures. The term includes polyesters, such as poly(ethylene terephthalate), the polycarbonamides such as 6-nylon and 66-nylon and other such materials as are well-known in the art. A particularly preferred plastic is high density polyethylene (i.e., having a density above about 0.940) homopolymer and copolymers. The preparation of such materials is disclosed in U.S. Patent 2,825,721. However, many other plastics would likewise be operable.

The expression "blowing agent" (foaming agent) is also used in its conventional sense to mean any material suitable for incorporation into plastics to form bubbles therein by the application of heat, reduction in pressure and the like as is known in the art. Among the suitable blowing agents which may be used in the practice of the present invention are gases such as nitrogen or the very volatile liquid fluorocarbons such as 1,2-dichloro-tetrafluoroethane and the like. The more preferred agents, however, are the chemical blowing agents which decompose with the liberation of a gas as one of the decomposition products. Such materials include barium azodicarboxate, 4,4'-oxybis(benzenesulfonylhydrazide), bis-benzenesulfonyl hydrazide, 4,4'-oxybis(benzenesulfonyl semicarbazide), dinitrosopentamethylene-tetramine, tryhydrazino-sym.-triazine, and 1,1-azobiscarbonamide. Other blowing agents are disclosed in U.S. Patents 2,532,243, 2,804,435, 2,819,231, 2,927,904, 2,948,664 and others. Particularly preferred blowing agents are azobiscarbonamide (see U.S. Patent 2,804,435) and para-toluene sulfonyl semicarbazide.

The expression "essentially the same chemical composition" is used to signify that the core and the outside layer contain essentially the same plastic and blowing agent. The controlled heat is applied to the outside of the structure during formation. The outside layer will contain the blowing agent in an undecomposed form while the core contains the same agent in the decomposed form. For the purpose of this invention, such differences are considered insignificant and correspondingly both the core and the outside layer are considered to have "essentially the same chemical composition."

Figure 2:
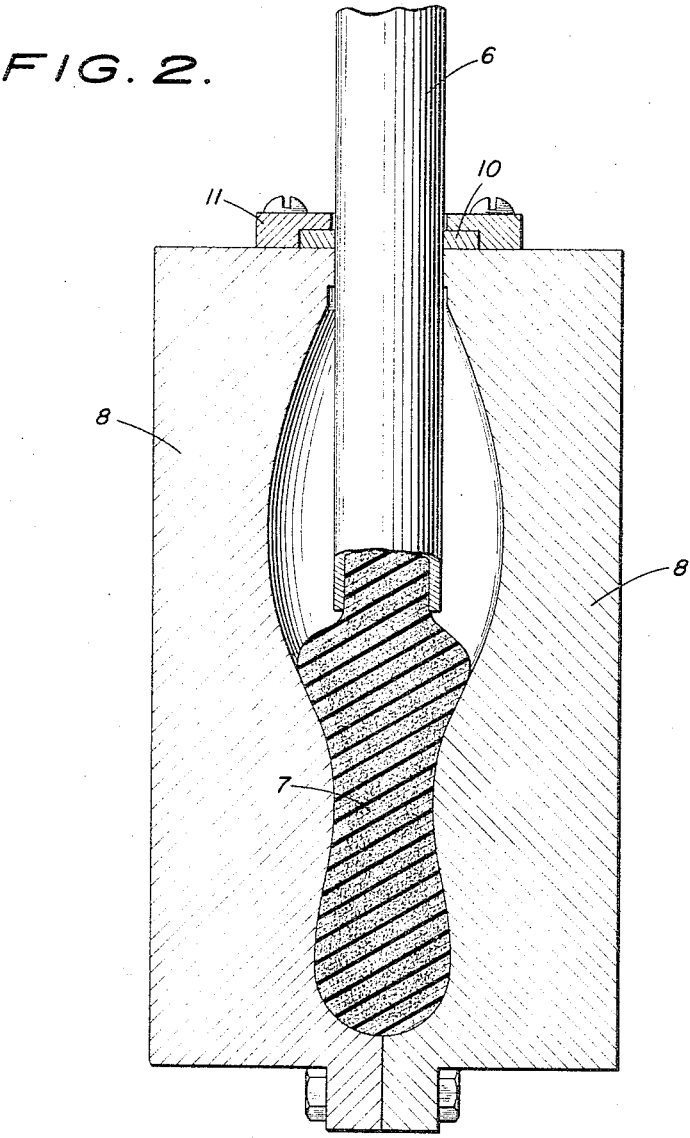

The present invention is hereinafter more fully described by reference to the drawings. In the accompanying drawings which illustrate preferred embodiments of the present invention:

FIGURE 1 shows in partial cross section a bowling pin produced in accordance with the present invention; and FIGURE 2 shows in cross section a mold being filled in accordance with the process of the present invention.

In FIGURE 1, the foamed plastic core 1 is covered with an integral substantially unfoamed plastic layer 2 which has a smooth outside surface 3 as it is taken from the mold. The smooth surface requires substantially no finishing step to produce a high gloss finish on the outside surface of the bowling pin. In practice, the bowling pin is generally molded with an extension 4 of the bowling pin which is severed from the pin at the base 5. A conventional base plate, which is generally nylon, is added to the base 5.

FIGURE 2 demonstrates a preferred method and mold for producing a bowling pin in accordance with the present invention. In FIGURE 2, the mold 8 is progressively filled by gravity from the filling tube 6 which extends into the mold and is gradually withdrawn as the mold fills. As the plastic emerges from the filling tube 6, the central portion of the plastic is at an elevated temperature and forms a foamed core 7. The outside portion of the plastic, however, cools below the blowing temperature of the blowing agent. Since the mold 8 is heated to a temperature above the softening point of the plastic, the whole mass remains molten until the mold is filled. At this point, the blowing agent in the molten mass has not completely decomposed. Correspondingly, when the slide 10, which is held by brackets 11, seals the mold after the withdrawal of the filling tube 6, pressure is built up within the mold cavity by the blowing agent which continues to form bubbles in the interior core. After a brief interval, normally a few minutes the mold is cooled and the final product as shown in FIGURE 1 is removed.

The thickness of the outside unfoamed layer can be controlled by various means. For example, additional pressure can be applied by the filling tube 6 by forcing more plastic into the mold cavity prior to sealing the mold with the slide 10 and this increases the thickness of the outside layer. To reduce the thickness of the outside layer, less plastic and more blowing agent can be employed. Also, a longer residence time in the extruder can be used to give more complete decomposition of the blowing agent prior to its introduction into the mold cavity to reduce thickness. Other variations such as temperature control of the extruder or mold can likewise be used.

The following examples are given to illustrate the invention and are not intended to limit it in any manner. All percentages are given in percent by weight, based on the weight of the plastic, unless otherwise indicated.

EXAMPLE 1

30 lbs. of pulverized flake of a commercial polyethylene copolymer (containing about 1% butene-1) having a density of 0.950, a melt index of 0.4 and a melting point of about 260° F. are mixed with 1% by weight of azobiscarbonamide (decomposition temperature about 350–360° F.) in a conventional double cone blender. The flake and blowing agent are mixed in the blender for 15 minutes at which time the mixture is homogenous. The resulting mixture is fed into the hopper of a 2½" "Hartig" extruder having the following zone temperatures: Zone 1 (feed end)—350° F., Zone 2—330° F., Zone 3—340° F. and extruder head temperature 340° F. The extruded plastic temperature is 395° F. The bowling pin mold, which has been preheated to a temperature of 260° F., is filled as shown in FIGURE 2 by progressively filling the mold from the bottom to the top while slowly withdrawing the filling tube. When the mold has become full, the filling tube is completely withdrawn and the mold sealed with a sliding plate. The surface temperature on the inside of the mold increases to between 260 and 340° F. which is above the melting point of the plastic. The mold is cooled with ambient air and fans for about 20 minutes at which time the mold temperature is about 150° F.

The resulting bowling pin is removed from the mold and it is noted that the surface is smooth, glossy and in a finished state with no surface defects. The bowling pin has a density of 0.70 and is a uniform light yellow color similar to finished wooden pins. Upon cross sectioning the bowling pin, it is found that the product has a uniform yellowish skin thickness of about 3/16" and a white very uniform interior foamed center.

EXAMPLE 2

The procedure of Example 1 is repeated with the exception that 1% by weight of titanium dioxide is also mixed with the polyethylene flake and azobiscarbonamide and a different temperature profile is employed in the "Hartig" extruder. The extruder temperatures are as follows: Zone 1 (feed end)—335° F., Zone 2—330° F., Zone 3—335° F. and extruder head temperature 335° F. The extruded plastic temperature is 380° F. The remainder of the procedure is the same as in Example 1.

The resulting bowling pin has a cream colored outside skin and a white foamed interior as in Example 1. The example shows that the titanium dioxide may be used to modify the color of the structure when the color results from the blowing agent employed in the example.

EXAMPLE 3

The procedure of Example 1 is repeated with the exception that after sealing the mold cavity, the mold is first cooled for 1–2 minutes at ambient conditions and then the whole mold is dropped into a tank of water at room temperature. After cooling for 5–10 minutes, the mold, which is at a temperature of about 150° F., is removed from the bath.

The resulting bowling pin is the same as that described in Example 1. The example merely shows that the mold can be cooled at a fast rate and that the mold need not be cooled at ambient conditions as is done in Examples 1 and 2.

EXAMPLE 4

The procedure of Example 1 is repeated with the exception that 1% by weight of titanium dioxide is mixed with the polyethylene flake and the azobiscarbonamide is replaced with 1% by weight of para-toluene sulfonyl semicarbazide (decomposition temperature about 400–410° F.). The temperature profile in the "Hartig" extruder is also varied from Example 1. The extruder temperatures are as follows: Zone 1 (feed end)—330° F., Zone 2—335° F., Zone 3—370° F. and extruder head temperature 380° F. The extruded plastic temperature is 410° F. and the mold is preheated to a temperature of 290° F. The temperature of the mold rises as the plastic enters but remains well under 400° F. The remainder of the procedure is the same as in Example 1.

The resulting bowling pin has a white outside layer and a white foamed interior. The example shows that other blowing agents, which do not color the final product, may be used so that the resulting product will have a white appearance rather than the yellowish cast given to the product by the azobiscarbonamide blowing agent.

While the amount of blowing agent in the plastic is not critical, it is generally desirable to employ from about 0.05 to about 10% by weight, based on the weight of the plastic, when the blowing agent is a chemical blowing agent. Preferably, from about 0.2 to about 5% by weight of blowing agent is employed. Similarly, the temperature of the plastic in the extruder may be selected as desired but, of course, it must be above both the softening point of the polymer and the decomposition point of the blowing agent. For polyethylene homopolymer and copolymers a temperature of from about 270° F. to about 525° F. is suitable with temperatures of from about 270° F. to about 400° F. being preferred depending on the blowing agent employed. With higher temperatures, it is generally desirable to use a shorter residence time in the extruder to prevent premature complete decomposition of the blowing agent. With other plastics, higher or lower temperatures may be desirable.

The mold itself is generally heated to a temperature slightly above the softening point of the plastic to keep the unfoamed layer in a molten condition until pressure has been built up within the mold cavity from the blowing agent. It is to be noted, however, that the latent heat of the extruded plastic will tend to elevate the temperature of the mold and, for this reason, the latent heat itself may be used to maintain the interior of the surface of the mold at a temperature between the softening point of the plastic and the decomposition point of the blowing agent. In such cases, a cooler mold may be desirable or necessary.

While in the above examples unmodified compositions are generally employed, it is obvious that other materials such as dyes, pigments, fibers, and other polymers may be introduced into the compositions without substantial alteration of the physical properties of the shaped structures formed from such compositions.

Many equivalent modifications will be apparent to those skilled in the art from a reading of the foregoing without a departure from the inventive concept.

What is claimed is:

1. A process for preparing a shaped structure having a foamed plastic core covered with an integral substantially unfoamed plastic layer having a smooth outside surface as molded, which comprises heating a composition containing a thermoplastic resin and a blowing agent to a temperature above both the softening point of the resin and the temperature at which the blowing agent forms bubbles, filling a constant-volume mold with said composition prior to complete formation of bubbles from the blowing agent, sealing the mold, maintaining the interior surface of the mold at a temperature above the softening point of the plastic and below the temperature at which the blowing agent forms bubbles until some pressure from the blowing agent builds up in the central portion of the mold cavity, cooling the plastic composition in the mold to solidify the plastic and removing the resulting shaped structure from the mold.

2. A process for preparing a shaped structure having a foamed high density polyethylene core covered with an integral substantially unfoamed high density polyethylene layer having a smooth outside surface as molded, which comprises heating a composition containing a thermoplastic and a blowing agent to a temperature above both the softening point of the resin and the temperature at which the blowing agent forms bubbles, filling a constant-volume mold with said composition prior to complete formation of bubbles from the blowing agent, sealing the mold, maintaining the interior surface of the mold at a temperature above the softening point of the high density polyethylene and below the temperature at which the blowing agent forms bubbles until some pressure from the blowing agent builds up in the central portion of the mold cavity, cooling the high density polyethylene composition in the mold to solidify the high density polyethylene and removing the resulting shaped structure from the mold.

3. The process of claim 2 wherein the blowing agent is azobiscarbonamide.

4. The process of claim 2 wherein the blowing agent is para-toluene sulfonyl semicarbazide.

References Cited by the Examiner

UNITED STATES PATENTS

| | | | |
|---|---|---|---|
| 2,767,436 | 10/1956 | Noland et al. | 264—321 |
| 2,806,255 | 9/1957 | Dietz | 264—54 |
| 2,893,877 | 7/1959 | Nickolls | 264—48 XR |
| 2,898,632 | 8/1959 | Irwin et al. | 264—48 |
| 3,058,161 | 10/1962 | Beyer et al. | 264—47 |
| 3,099,516 | 7/1963 | Henrickson | 264—48 |
| 3,147,974 | 9/1964 | Tomarkin | 273—82 |
| 3,155,753 | 11/1964 | Weissman et al. | 273—82 XR |
| 3,169,766 | 2/1965 | Ernest | 273—82 |
| 3,200,176 | 8/1965 | Baxter | 264—54 |
| 3,211,605 | 10/1965 | Spaak et al. | 264—321 XR |
| 3,218,375 | 11/1965 | Hardwick | 264—48 |

FOREIGN PATENTS 641,073    5/1964    Canada.

OTHER REFERENCES

Modern Plastics, " . . . and why not nitrogen as a filler?" vol. 38, No. 9, May 1961, p. 164.

Zielinski, A. R. "Injection molding expandable polystyrene beads." In Plastic World, January 1962, pp. 18–21.

ALEXANDER H. BRODMERKEL, *Primary Examiner.*

ROBERT F. WHITE, *Examiner.*

P. E. ANDERSON, *Assistant Examiner.*